March 2, 1965 TSUYOSHI NISHIMURA 3,171,282

SAFETY DEVICE FOR MAGNETIC ESCAPEMENT

Filed Dec. 7, 1961

United States Patent Office 3,171,282
Patented Mar. 2, 1965

3,171,282
SAFETY DEVICE FOR MAGNETIC ESCAPEMENT
Tsuyoshi Nishimura, Saitama-ken, Japan, assignor to Kabushiki Kaisha Hattori Tokeiten, Tokyo-to, Japan, a joint-stock company of Japan
Filed Dec. 7, 1961, Ser. No. 157,807
Claims priority, application Japan, June 26, 1961, 36/22,282; July 26, 1961 (utility model) 36,/31,665
2 Claims. (Cl. 74—1.5)

This invention relates to magnetic escapements of timepieces and the like and more particularly to a safety device which stabilizes the movement of an oscillator.

The nature of the invention will be best understood by reference to the following description when taken in conjunction with the accompanying illustrations in which the same and equivalent parts are designated by the same reference numerals or letters, and in which.

Figure 1:
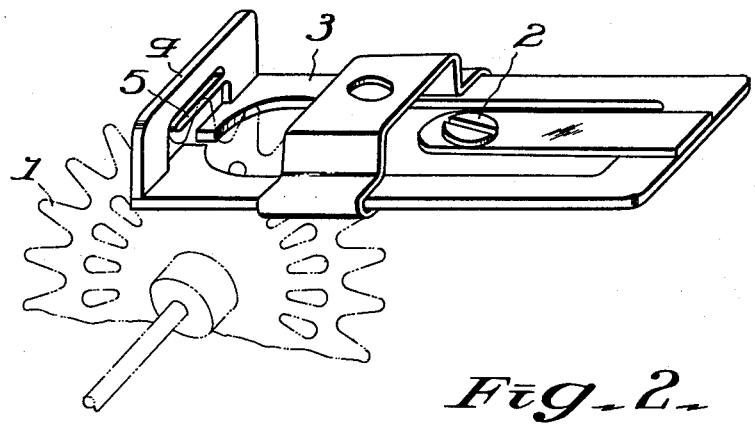
FIG. 1 is a perspective view showing one representative embodiment of the safety device according to the present invention.
Figure 2:
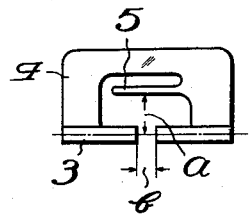
FIG. 2 is an elevational view of the embodiment shown in FIG. 1.

In a magnetic escapement of the type wherein as shown in FIGS. 1 and 2, a magnet 3 is coupled magnetically to an escape wheel 1 and oscillates about a pivot 2 to govern the speed of rotation of the escape wheel through escape action, the coupling between the magnet and the escape wheel may be broken when the normal escape action is disrupted by an external force such as an impulsive force. In this case, the escape wheel rotates in an ungoverned manner, whereby performance failure, such as stoppage of the oscillation of the magnet, may be caused. Accordingly, it has been the conventional practice to fix to the extreme end of the magnet a bridge plate 4 which will engage with the gear teeth ends of the escape wheel. When an abnormal operation occurs, this bridge plate is caused to arrest a gear tooth of the escape wheel, thereby locking the escape wheel against run away.

However, since the height of the bridge plate relative to the magnet is fixed, in order to establish the correct relative positions of the escape wheel and the magnet and, at the same time, the correct relative positions of the escape wheel and the bridge frame, an extremely high degree of precision is required in the fabrication of the escape wheel, magnet, bridge frame, and related parts. If this precision is lacking, the bridge plate cannot arrest the escape wheel in a stable manner unless the relative positions of the escape wheel and the magnet are disturbed by establishing the positions of the bridge plate and the escape wheel.

Furthermore, since the escape wheel of a magnetic escapement of this type is a toothed wheel made of a soft material of high permeability, it is prone to such damage as being bent by impulsive force when it is arrested and locked by the bridge plate.

Another problem is presented by the method of joining the bridge plate, which is made of a non-magnetic material, to the magnet, which is made of a very hard material. It has been the common practice to fit protruding parts provided on the bridge plate into corresponding recesses provided in the magnet and to fasten the two members by hammering the said protruding parts so as to deform them and cause them to be fastened securely in their respective recesses. Such a fastening method, however, is disadvantageous. If the fastening is done after the magnetization of the magnet, its magnetism will be weakened by the violent impact and vibration unavoidably imparted to the magnet during the fastening process. If the fastening is done prior to the magnetization, the magnetization process of the magnet with the bridge plate as an appended, extraneous body will be difficult and inefficient. In either case, the magnetic polar gap $b$ of the magnet will be subject to change caused by the impulsive force of the hammering, and the magnetic flux density between the magnetic poles will be varied, whereby the performance of the magnetic coupling between the magnet 3 and the escape wheel 1 will become defective. Moreover, since the magnet is made from a very hard steel, the process of providing it with a recess, such as a hole or a slot, for a joint is difficult and requires excessive labor and, consequently, high production cost.

In view of the various above-stated difficulties accompanying the construction of a safety device of the instant type, it is an object of the present invention to provide a new and improved safety device for magnetic escapements wherein the possibility of the operation of the said safety device affecting other parts (for example: the escape wheel) is eliminated.

It is another object of the invention to provide uniformity of the magnetic polar gap of the oscillating member so as to facilitate the mass production of the safety device according to the invention.

It is a further object of the invention to provide a safety device as stated above in which means are provided whereby the relative positions of the teeth tips of the escape wheel and the safety device can be adjusted as desired without changing the positions of the magnetic poles relative to the escape wheel.

The foregoing objects, other objects, and advantages of the present invention have been attained by the present invention, the details of which are presented below.

In one aspect of the invention, an arm 5 of cantilever beam configuration is formed on the inner edge of the bridge frame 4, confronting the escape wheel 1, and is so adapted that its extreme end can be deformed vertically in bending. By this bending of the arm 5 by a suitable amount, the height "$a$" of the arm relative to the magnet 3, as shown in FIG. 2, can be adjusted in a simple manner. Accordingly, by this adjustment, the relative position of the arm 5 necessary for arresting the ungoverned rotation of the escape wheel 1 by means of this arm can be easily determined.

Moreover, since this arm 5 is a cantilever beam which branches out from the main structure of the bridge plate, the bending deformation imparted to this arm has no permanent effect on the bridge plate itself. Accordingly, no deviation whatsoever is developed in the magnetic polar gap $b$, which is extremely important for the magnetic coupling of the magnet 3 to the escape wheel 1. Furthermore, since the arm 5 has a lower degree of rigidity than the bridge plate main structure and is adapted to be pliable relative to external forces, it is capable of arresting the ungoverned rotation of the escape wheel without deforming the tips of the escape wheel teeth.

Figure 3A:
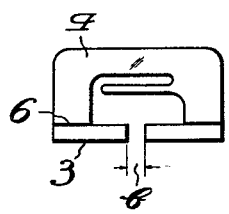
FIGS. 3A, 3B and 3C are elevational and perspective views showing various methods of joining the bridge plate to the magnet member.
Figure 3B:
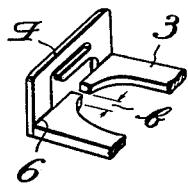
Figure 3C:
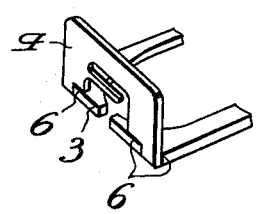

In another aspect of the invention, as shown in FIGS. 3A, 3B, and 3C, the bridge plate 4 is joined rigidly to the magnet 3 by means of an adhesive 6 with sufficient strength so as to withstand stresses due to the magnet oscillation for escapement operation and to arresting of the escape wheel by the bridge plate when abnormal operation occurs.

Since, according to the present invention, the magnet and the bridge plate are bonded by an adhesive, the bonding work can be accomplished after the magnetization of the magnet. Moreover, since the bonding process does not cause a large external force to be imparted to the magnet, the magnetic strength of the magnet is not reduced, and the magnetic polar gap $b$ is not disturbed. Accordingly, the magnetic coupling performance between the magnet and escape wheel is not impaired. Furthermore, since fastening by means of an adhesive, in comparison with hammering or calking, requires less labor and affords as easier process, the cost of production is lower.

Since it is obvious that many changes and modifications in the above-described details can be made without departing from the nature and spirit of the invention, it is to be understood that the invention is not to be limited to the details described herein except as set forth in the appended claims.

What is claimed is:

1. A magnetic escapement of the type comprising a magnet having opposed poles, a toothed wheel with an edge shaped to form an escape wheel rotatably mounted with its edge between the opposed poles of the magnet, a bridge of non-magnetic material secured to each of said opposed poles and overlying the same substantially in a plane intersecting said poles and the axis of rotation of said escape wheel, said bridge having a notch therein of sufficient extent to allow free passage of the teeth of said escape wheel therebelow, and an integral cantilever arm extending from one side of said bridge between the upper and lower extremities of the notch and generally parallel to the axis of rotation of said escape wheel to form a stop for said wheel to prevent ungoverned rotation of said wheel, said arm being adjustable by bending in said plane containing the axis of rotation of the escape wheel whereby the spacing of said arm with respect to said opposed poles and the teeth of said escape wheel may be accurately adjusted.

2. The escapement according to claim 1, wherein said bridge is fastened to the opposed poles end of said magnet by an adhesive so as not to impart a detrimental effect to the magnet structure.

References Cited in the file of this patent

UNITED STATES PATENTS

| 2,727,650 | Moynihan et al. | Dec. 20, 1955 |
| 2,762,222 | Clifford | Sept. 11, 1956 |
| 2,941,417 | Junghans et al. | June 21, 1960 |

OTHER REFERENCES

British Magnetic Clock Escapement Cuts Friction Loss, Product Engineering, April 1951, pp. 113 and 114. (Copy in Scientific Library.)